United States Patent [19]
Glennon

[11] Patent Number: 5,977,645
[45] Date of Patent: Nov. 2, 1999

[54] AIRCRAFT SECONDARY POWER SYSTEM

[75] Inventor: Timonthy F. Glennon, Rockford, Ill.

[73] Assignee: Sundstrand Corporation, Rockford, Ill.

[21] Appl. No.: 08/885,158

[22] Filed: Jun. 30, 1997

[51] Int. Cl.⁶ .................................................. F02N 11/86
[52] U.S. Cl. .................. 290/40 F; 290/38 R; 290/40 A; 290/40 B; 290/40 F; 290/51; 322/10; 322/29; 322/32; 322/90
[58] Field of Search .............................. 290/38 R, 40 B, 290/40 F; 322/32, 29, 90, 10

[56] References Cited

U.S. PATENT DOCUMENTS

| | | | |
|---|---|---|---|
| 2,908,776 | 10/1959 | Nolden et al. | 200/4 |
| 3,132,297 | 5/1964 | Erickson | 322/59 |
| 3,519,843 | 7/1970 | Trautman | 307/65 |
| 3,555,290 | 1/1971 | Ellermeyer | 306/65 |
| 4,330,743 | 5/1982 | Glennon | 322/10 |
| 4,356,402 | 10/1982 | Morimoto et al. | 307/19 |
| 4,467,220 | 8/1984 | Page | 307/19 |
| 4,488,198 | 12/1984 | Christen et al. | 361/20 |
| 4,638,175 | 1/1987 | Bradford et al. | 307/64 |
| 4,659,942 | 4/1987 | Volp | 307/19 |
| 4,684,081 | 8/1987 | Cronin | 244/58 |
| 4,743,776 | 5/1988 | Baehler et al | 290/31 |
| 4,830,412 | 5/1989 | Raad et al. | 290/31 |
| 4,862,342 | 8/1989 | Dhyanchand et al. | 363/40 |
| 4,927,329 | 5/1990 | Kliman et al. | 416/127 |
| 4,967,097 | 10/1990 | Mehl | 307/84 |
| 5,036,267 | 7/1991 | Markunas et al. | 322/10 |
| 5,055,764 | 10/1991 | Rozman et al. | 322/10 |
| 5,266,838 | 11/1993 | Gerner | 307/19 |
| 5,281,905 | 1/1994 | Dhyanchand et al. | 322/32 |
| 5,309,081 | 5/1994 | Shah et al. | 322/10 |
| 5,317,498 | 5/1994 | Dhyanchand et al. | 363/43 |
| 5,627,744 | 5/1997 | Baker et al | 363/165 |
| 5,764,502 | 6/1998 | Morgan et al. | 363/65 |

FOREIGN PATENT DOCUMENTS

A1 3/1989 European Pat. Off. ........ B64D 41/00

*Primary Examiner*—Elvin G. Enad
*Attorney, Agent, or Firm*—Marshall, O'Toole, Gerstein, Murray & Borun

[57] ABSTRACT

A secondary power system for an aircraft utilizes a variable frequency electrical distribution system that provides power to one or more loads that can tolerate distortion components. In addition, a DC distribution system is coupled to the variable frequency distribution system and is isolated from a fixed frequency electrical distribution. Distortion caused by rectification for the DC system is isolated from the fixed frequency system, thereby improving the power quality in the fixed frequency system.

20 Claims, 4 Drawing Sheets

AIRCRAFT SECONDARY POWER SYSTEM

TECHNICAL FIELD

The present invention relates generally to power supply systems, and more particularly to a secondary power system for an aircraft.

BACKGROUND ART

Current aircraft rely on electric, pneumatic and hydraulic systems for secondary power. A typical electric system utilizes an integrated drive generator (IDG) coupled to each engine to provide fixed frequency 400 Hz power to the distribution system and loads. Alternatively, a generator may be directly coupled to each aircraft engine and the variable frequency power developed by the generator(s) may be converted into fixed frequency power by a power converter. In either case, a 28 volt DC system may further be provided for some loads. The pneumatic system utilizes bleed air from the main engine compressors to provide pneumatic power for de-icing, environmental control and cabin pressure, main engine start and air driven hydraulic pumps. The hydraulic system consists of main engine driven pumps, electrically driven pumps and pneumatically driven pumps. An auxiliary power unit (APU) typically provides pneumatic, electrical and, occasionally, hydraulic power.

While the foregoing systems are useful to provide secondary power as required by aircraft loads, such systems are not jointly optimized to reduce size, weight and cost. Particularly, the hydraulic system is poorly sized with respect to speed and flow requirements. Hydraulic flow requirements typically are greatest when engine speeds are low and lessen at high cruise speeds. These requirements, however, are inconsistent with the flow handling capabilities of engine-driven pumps, which develop highest flow rates only at high engine speeds. Attempting to shift hydraulic loads to electrically driven pumps is not a good solution because the motors for such pumps usually create inrush current problems for the electrical system. Air driven pumps could be used, but they are large and inefficient.

Air turbine start equipment is large, heavy, expensive and located in the tightly packaged engine nacelle. This equipment is used only one or two minutes per flight and is thereafter merely extra weight which detracts from the load handling capability of the aircraft.

The aircraft electrical system provides high quality power to all loads, including those that do not need it. Galley equipment and solid state driven pumps are examples of those loads that do not require high quality power.

Ground engine start requires the APU to be running or a pneumatic ground cart which adds to the expense of airport operations.

SUMMARY OF THE INVENTION

A secondary power system for an aircraft redistributes loads among the various power systems so that substantial benefits are obtained.

More particularly, a power system for an aircraft having an engine includes a variable frequency generator coupled to the engine and a variable frequency electrical distribution system coupled to the variable frequency generator. The variable frequency generator receives power from the variable frequency electrical distribution system during operation in a starting mode to start the engine. During operation in the generating mode, the variable frequency generator delivers power to the variable frequency electrical distribution system for variable frequency loads. A power converter is coupled to the variable frequency electrical distribution system. The power system further includes a hydraulic distribution system and an electrically driven hydraulic pump coupled between the power converter and the hydraulic distribution system wherein the hydraulic pump receives power from the power converter during operation in the generating mode to provide hydraulic power to the hydraulic distribution system.

Preferably, a DC electrical distribution system is coupled to the power converter. Also, an integrated drive generator (IDG) is preferably coupled to the engine and a fixed frequency electrical distribution system is preferably coupled to the IDG.

Also in accordance with the preferred embodiment, the DC electrical distribution system is isolated from the fixed frequency electrical distribution system. Still further, a battery may be coupled to the DC electrical distribution system.

A pneumatic distribution system may be provided which is isolated from the hydraulic distribution system and which receives bleed air from the engine. A hydraulic pump may be driven by the engine and may be coupled to the hydraulic distribution system. Still further, an auxiliary power unit (APU) is preferably coupled by a variable frequency starter generator to the variable frequency electrical distribution system.

In accordance with a highly preferred form of the present invention, the variable frequency distribution receives 50–60 Hz power during operation in the starting mode.

In accordance with a further aspect of the present invention, a power system for an aircraft having a main engine and an auxiliary power unit (APU) includes a variable frequency generator coupled to the main engine and a variable frequency electrical distribution system coupled to the variable frequency generator. The variable frequency generator receives power from the variable frequency electrical distribution system during operation in a starting mode to start the engine and delivers power to the variable frequency electrical distribution system for variable frequency loads during operation in a generating mode. A bidirectional power converter is coupled to the variable frequency electrical distribution system and a hydraulic distribution system is provided wherein an electrically driven hydraulic pump is coupled between the power converter and the hydraulic distribution system. The electrically driven hydraulic pump receives power from the power converter during operation in the generating mode to provide hydraulic power to the hydraulic distribution system. A pneumatic distribution system is coupled to the APU and the main engine and receives air therefrom wherein the pneumatic distribution system is isolated from the hydraulic distribution system.

In accordance with yet another aspect of the present invention, a power system for an aircraft having a main engine and an auxiliary power unit (APU) includes a first variable frequency generator coupled to the main engine, a second variable frequency generator coupled to the APU and a variable frequency electrical distribution system coupled to the first and second variable frequency generators. The variable frequency generators receive power from the variable frequency electrical distribution system during operation in the starting mode to start the engine or the APU. The variable frequency generators deliver power to the variable frequency electrical distribution system for variable frequency loads during operation in the generating mode. The first power converter is coupled to the variable frequency electrical distribution system and a hydraulic distribution system is provided wherein an electrically driven hydraulic pump is coupled between the first power converter and the hydraulic distribution system. The hydraulic pump receives power from the power converter during operation in the generating mode to provide hydraulic power to the hydraulic distribution system. An integrated drive generator (IDG) is coupled to the main engine and a fixed frequency electrical distribution system is coupled to the IDG. A second bidirectional power converter is coupled to the variable frequency electrical distribution system and a DC electrical distribution system is coupled to the second power converter. The DC electrical power distribution system is isolated from the fixed frequency electrical distribution system.

Other aspects and advantages of the present invention will become apparent upon consideration of the following drawings and detailed description.

DESCRIPTION OF THE PREFERRED EMBODIMENT

Figure 1:
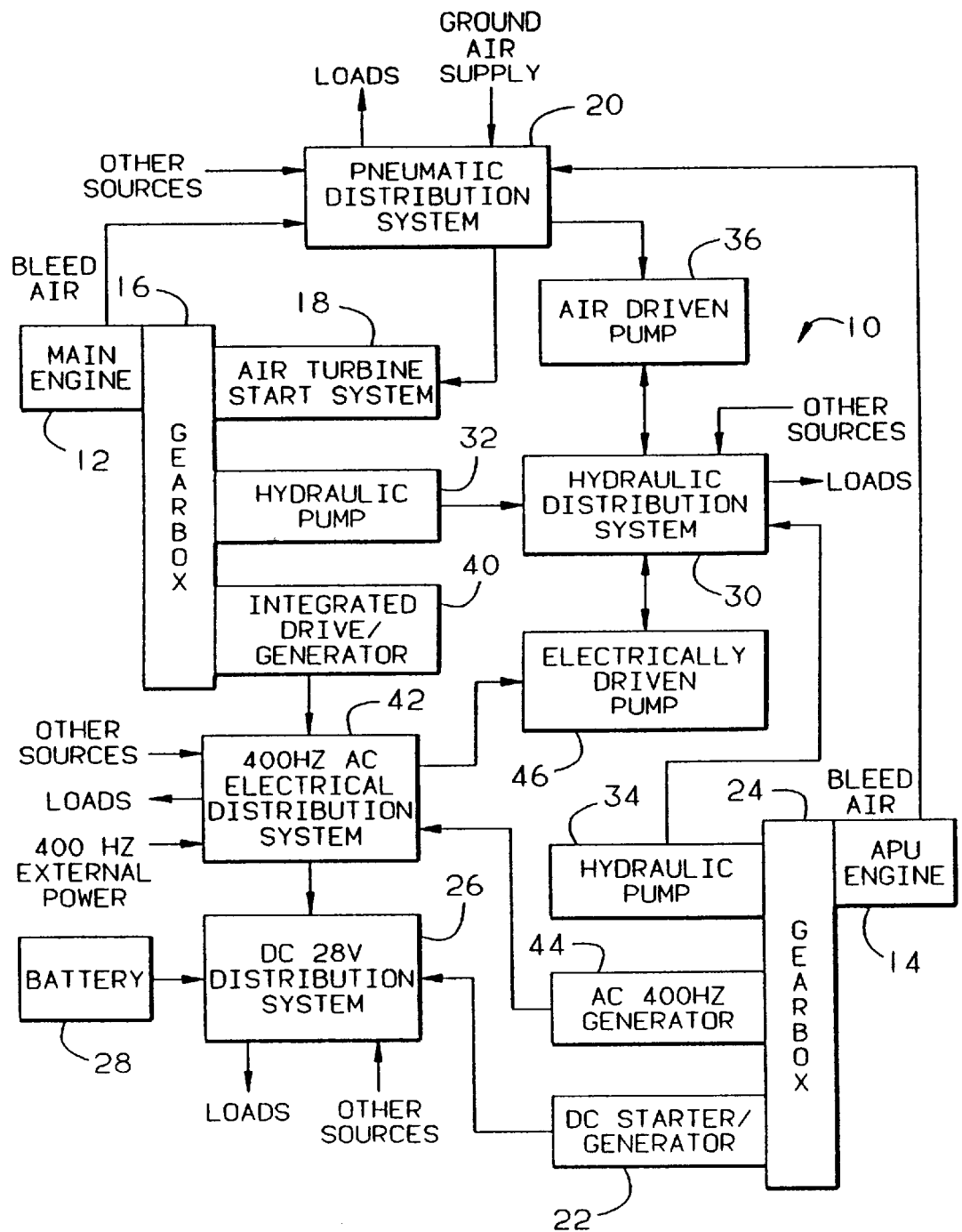
FIG. 1 is a block diagram of a conventional aircraft secondary power system.

FIG. 1 illustrates a prior art secondary power system for an aircraft. The power system includes a number of (for example, three) distribution systems which are coupled to an aircraft main engine 12 and an auxiliary power unit (APU) 14. It should be noted that additional main engines and/or APU's may be provided on-board an aircraft, and that one or more of the distribution systems (as well as other distribution system(s) not shown in the FIGS.) may be coupled to such other prime movers, as desired.

The main engine 12 is coupled to a gear box 16, which in turn is coupled to an air turbine start system 18. The air turbine start system 18 is conventionally located in the engine nacelle of the aircraft and includes the usual equipment required to start the main engine 12. The air turbine start system 18 receives pneumatic power from a pneumatic distribution system 20 which may additionally provide power to other air driven loads. During starting, the pneumatic system 20 may receive pressurized air from a ground air supply or from a different source and such pressurized air may be provided to the air turbine start system 18.

Once the main engine 12 is brought up to self-sustaining speed, the main engine 12 may thereafter provide bleed air to the pneumatic distribution system 20.

The APU 14 is started by a DC starter/generator 22 which is coupled to the APU 14 by a gear box 24. Power for the DC starter generator 22 is obtained from a DC electrical distribution system 26 which, in turn, receives external power from a battery 28 or other power source. Once the APU 14 is started, bleed air may be subsequently provided to the pneumatic distribution system 20 by the APU 14.

Both the main engine 12 and the APU 14 provide hydraulic power to a hydraulic distribution system 30 by means of hydraulic pumps 32, 34, respectively. The hydraulic distribution system 30 also receives hydraulic power from the pneumatic distribution system via an air driven pump 36. Other sources of hydraulic power may also be coupled to the hydraulic system 30, as are one or more hydraulic loads.

An integrated drive/generator (IDG) 40 is coupled to the gear box 16 and converts the variable speed motive power produced by the main engine 12 into fixed frequency power at, for example, a frequency of 400 Hz. This power is provided to a fixed frequency electrical distribution system 42 which supplies fixed frequency power for AC loads on-board the aircraft. Fixed frequency 400 Hz. power may be obtained from an external power source or another generator 44 coupled to the gear box 24 or any other source, and such power may be supplied to the electrical distribution system 42.

An electrically driven pump (EDP) 46 may receive power from the fixed frequency electrical distribution system 42 and may provide hydraulic power to the hydraulic distribution system 30. In addition, the DC electrical distribution system 26 may receive power from the fixed frequency electrical distribution system 42, in which case a transformer-rectifier unit (TRU) of the distribution system 26 converts the fixed frequency AC power into DC power for DC loads.

As noted above, the hydraulic system is not well-sized for the loads and the remaining systems are not optimally designed in combination.

Figure 2:
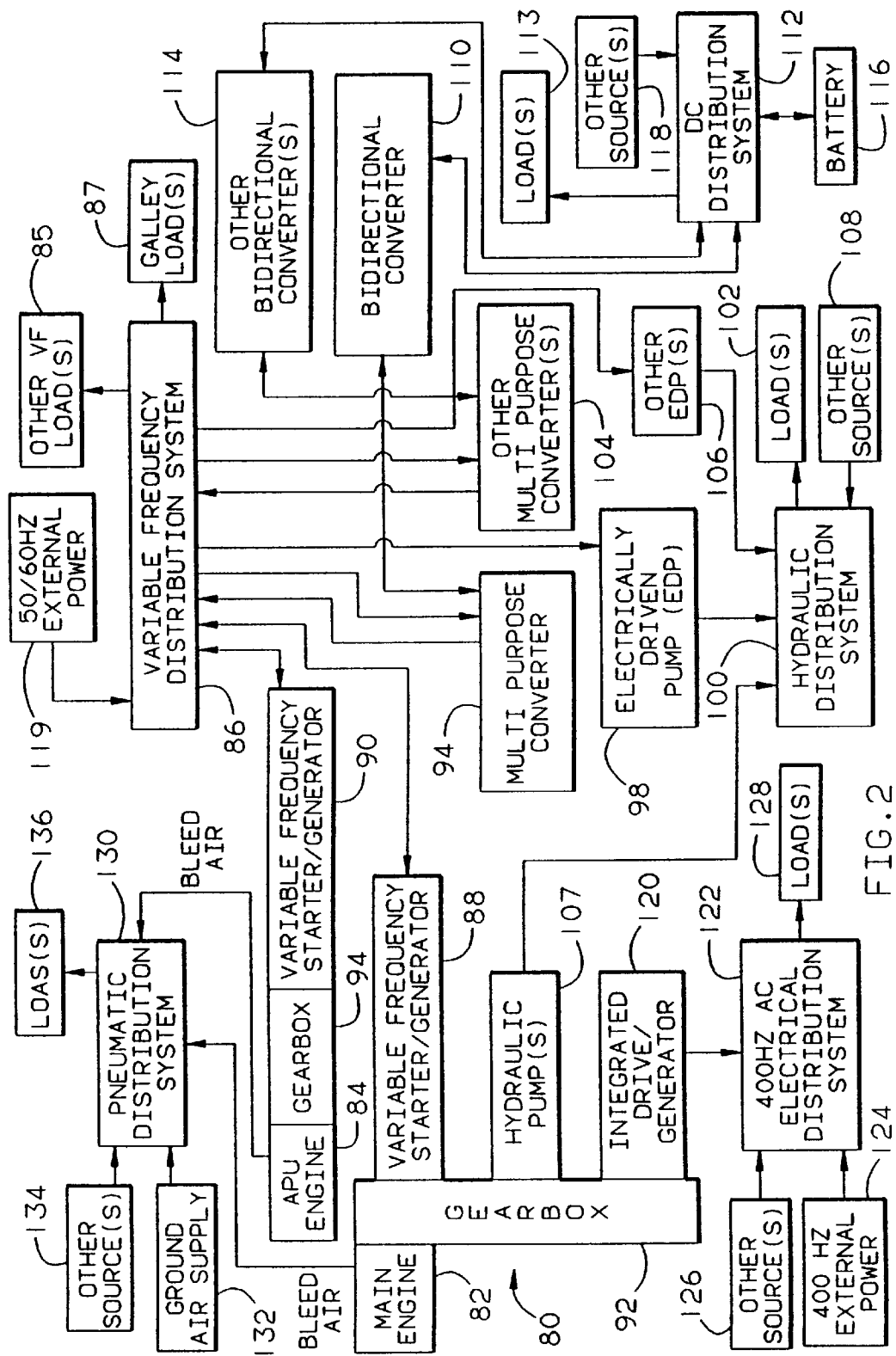
FIG. 2 is a block diagram illustrating an aircraft secondary power system according to the present invention.

Referring now to FIG. 2, a secondary power system 80 for an aircraft according to the present invention is illustrated. During operation in a generating mode, the power system 80 obtains motive power from a main aircraft jet engine 82 (which may be the sole main engine or which may be one of several main engines for the aircraft) and an optional APU 84. The power system 80 includes a variable frequency distribution system 86 which comprises controllable contactors and feeders as well as power converters for converting variable frequency electrical power into controlled and/or conditioned AC or DC power as required. Variable frequency power is directly applied to variable frequency loads 85, including galley loads 87. The variable frequency distribution system 86 is further coupled to first and second variable frequency starter/generators 88, 90 which are coupled by gear boxes 92, 94 to the main engine 82 and the APU 84, respectively.

The variable frequency distribution system 86 is further coupled to a multipurpose power converter 96 which provides power to an EDP 98 via the variable frequency distribution system 86. During starting, power may be returned by the multipurpose power converter 96 to the variable frequency distribution system 86 and thence to the starter/generator 90. During operation in the generating mode, the EDP 98 provides hydraulic power to a hydraulic distribution system 100 interconnected with one or more hydraulic loads 102. The hydraulic distribution system may further receive hydraulic power from other multipurpose power converters 104 (each of which may be identical to the multipurpose power converter 96) and EDP's 106 coupled to the variable frequency distribution system 86, one or more hydraulic pumps 107 coupled to the gear box 92 and/or from one or more other hydraulic sources 108.

A bidirectional power converter 110 is coupled between the multipurpose power converter 96 and a DC distribution system 112 which provides power for DC load(s) 113. If necessary or desirable, for example, during APU starting, the DC distribution system may further be coupled by one or more additional bidirectional power converters 114 (each of which may be identical to the bidirectional converter 110) to the other multipurpose converters 104, as well as a battery 116 and/or one or more other DC sources 118.

During operation in a starting mode, the variable frequency distribution system 86 receives suitable electric power, for example available 50/60 hertz power from a source 119 such as a local utility, and converts through the multipurpose converters 104 such power into suitable AC power to operate the starter/generator(s) 88, 90 as motor(s) to start the main engine 82 and/or the APU 84. Power for APU starting may instead be obtained from the battery 116 or other DC source(s) 118 and the DC distribution system 112, one of the bidirectional converters 110, 114 and one of the multipurpose converters 96, 104. In the latter case, the power is preferably applied only to the starter/generator 90 to start the APU 84. Thereafter, the APU supplies motive power to the starter/generator 90 to cause the latter to supply electric power to the variable frequency distribution system 86, which, in turn, provides suitable AC power to the starter/generator 88 through the multipurpose converters 96 or 104 for starting of the main engine 82. Regardless of which starting power source and sequence is used, the power applied to the starter/generator(s) 88, 90 is controlled in a known fashion to provide a controlled speed versus time profile for more reliable starting and reduced high temperature stress.

An IDG 120 is coupled to the gear box 92 and a fixed frequency distribution system 122 receives 400 hertz power from the IDG 120 and/or from an external power source 124 and/or one or more other fixed frequency sources 126 for one or more fixed frequency electrical loads 128. As should be evident from an inspection of FIG. 2, the DC distribution system is isolated from the fixed frequency distribution system 120.

As in the prior art system of FIG. 1, a pneumatic distribution system 130 receives bleed air from the main engine 82 and the APU 84 as well as a ground air supply 132 and/or one or more other pneumatic sources 134. The pneumatic distribution system 130 distributes pneumatic power for one or more pneumatic loads 136 and, in the preferred embodiment illustrated in FIG. 2, is isolated from the hydraulic distribution system 100.

Figure 3:
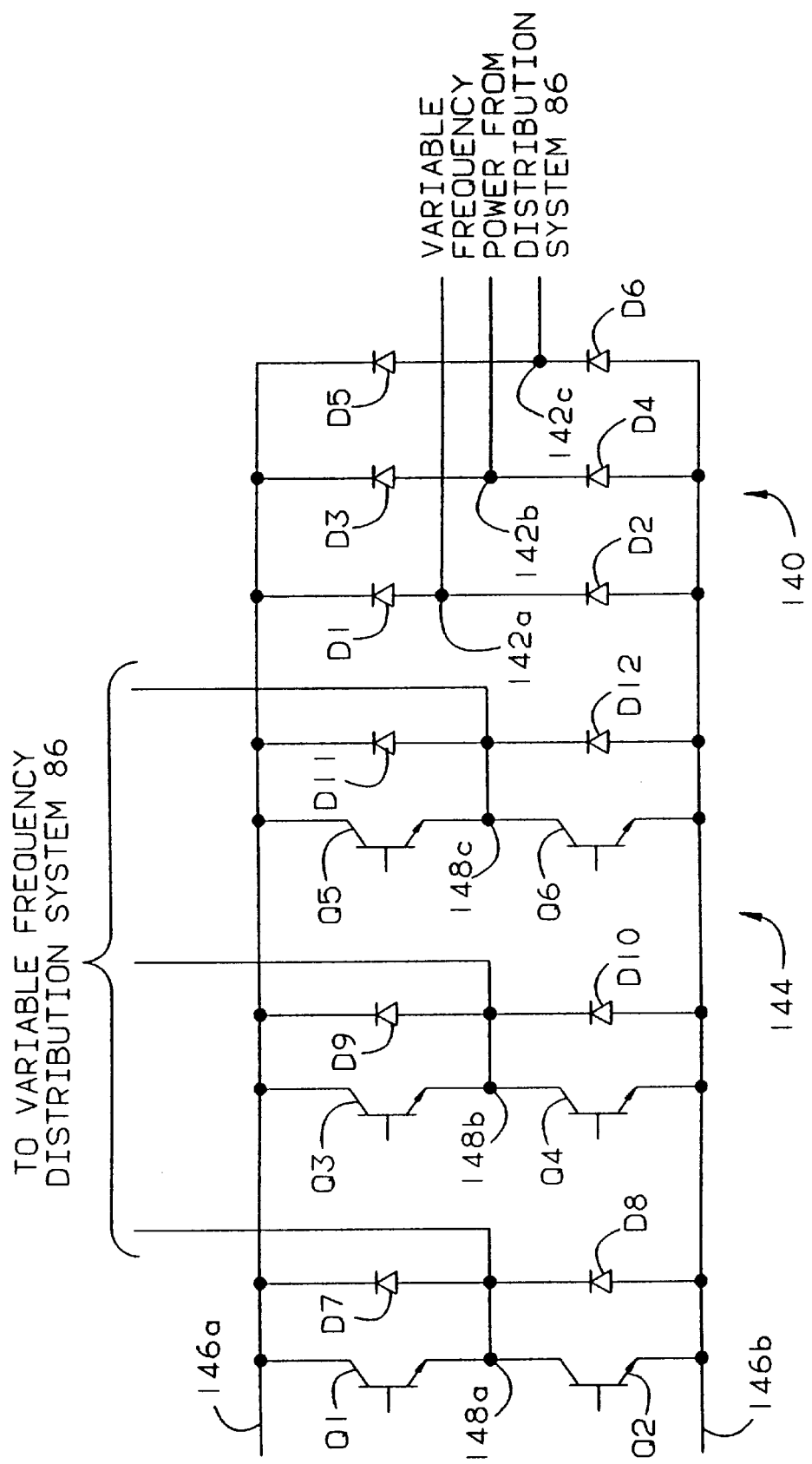
FIG. 3 is a simplified schematic diagram of one of the multipurpose converters of FIG. 2.

FIG. 3 illustrates the multipurpose power converter 96. The converter 96 includes a rectifier bridge 140 comprising diodes D1–D6 connected in a conventional three-phase, full-wave configuration. Junctions 142a–142c receive variable frequency power from the variable frequency distribution system 86. An inverter stage 144 is coupled across DC conductors 146a, 146b of a first DC link. The inverter stage 144 includes first through sixth controllable switching devices in the form of transistors Q1–Q6, which may comprise IGBT's, power MOSFET's or the like. Flyback/rectifier diodes D7–D12 are coupled across the transistors Q1–Q6, respectively. Junctions 148a–148c forming phase outputs of the inverter stage 144 are coupled to the variable frequency distribution system 86.

Figure 4:
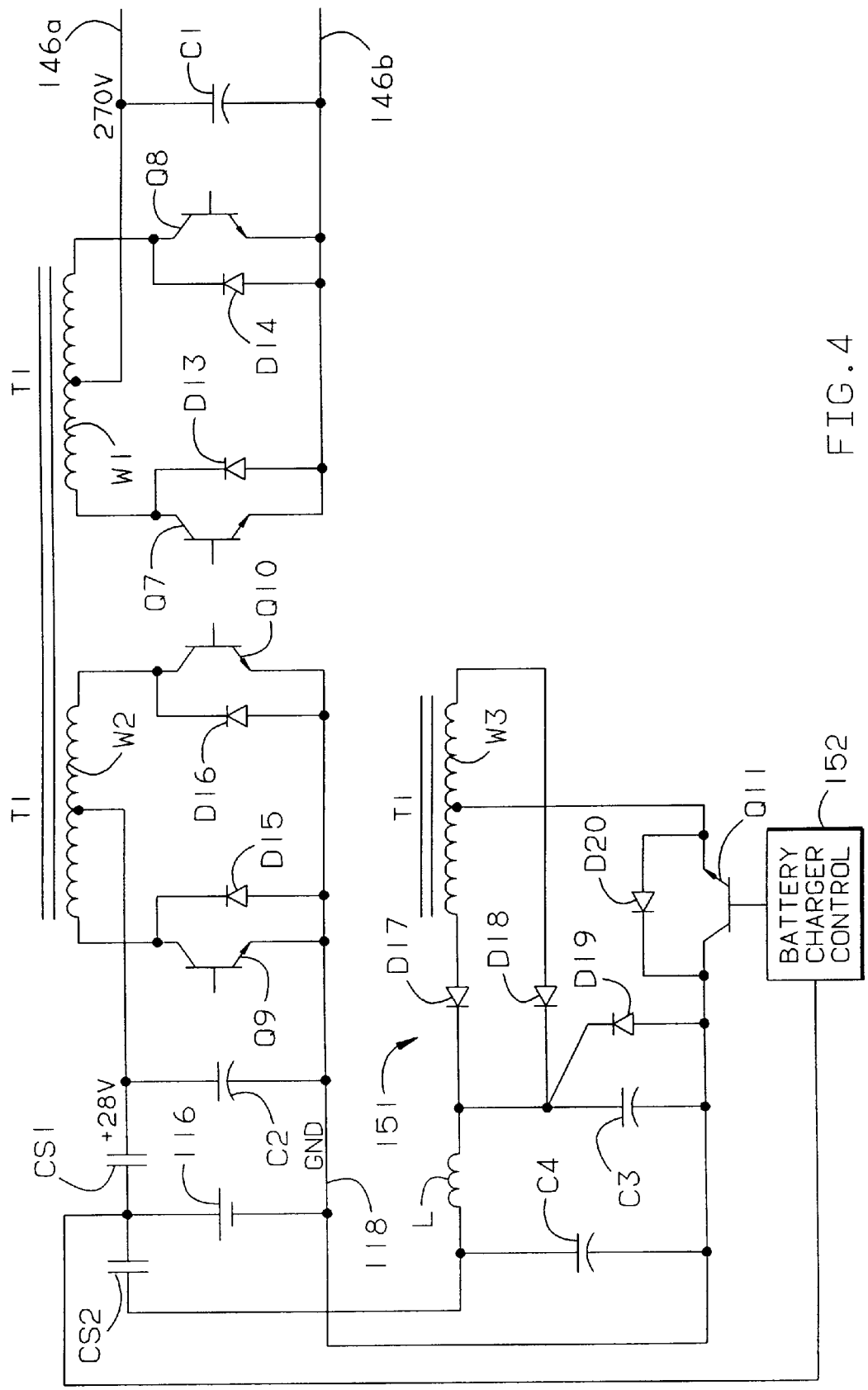
FIG. 4 is a simplified schematic diagram of one of the bidirectional converters of FIG. 2.

A bidirectional DC-DC converter 150 (seen in detail in FIG. 4) includes a capacitor C1 coupled across the DC link conductors 146a, 146b and a transformer T1 having first through third windings W1–W3, respectively. Ends of the winding W1 are coupled to controllable switches Q7, Q8 and associated flyback/rectifier diodes D13, D14, respectively. A mid-tap of the winding W1 is coupled to the conductor 146a while the conductor 146b is coupled to the controllable switches Q7, Q8 and the diodes D13, D14.

Ends of the winding W2 are coupled to controllable switches Q9, Q10 and associated flyback/rectifier diodes D15, D16. A midtap of the winding W2 is coupled to one end of a capacitor C2 and thence by contacts of a contactor set CS1 to the battery 116. A ground conductor 118 is coupled to another end of the battery 116 and further is coupled to the emitters of the controllable switches Q9, Q10.

It should be noted that the controllable switches Q7–Q10 may comprise power transistors or other switching devices of suitable power rating, including IGBT's, power MOSFET's or the like.

A further contactor set CS2 interconnects the high voltage terminal of the battery 116 with a battery charger circuit 151 including a battery charger control 152 which operates a power transistor Q11, the winding W3 of the transformer T1, diodes D17–D20 and energy storage elements comprising capacitors C3, C4 and an inductor L. The battery charger control 152 operates the power transistor Q11 at a switching rate determined by the voltage on the battery 116 to control the rectified power delivered thereto.

As should be evident from the foregoing, the secondary power system 80 of FIG. 2 according to the present invention utilizes a simple variable frequency distribution system 86 which develops power for engine starting, running more hydraulic pumps electrically, galley loads and DC system source power. This, in turn, is made possible through the use of the multipurpose converters 96, 104, which adapt their function to either engine starting or running a particular hydraulic pump 98, 106. The bidirectional converters 110, 114 translate power between the DC distribution system 112 and the DC link of the multipurpose converters 96 and/or 104.

The following advantages are gained in the system of FIG. 2:

Main Engine Benefits

No air turbine starter equipment is required in the nacelle, resulting in reduced ducting. Further, bleed air requirements are reduced owing to the elimination of air driven pumps. This results in better specific fuel consumption (i.e., gallons of fuel per pound of thrust). In addition, starting reliability is improved and high temperature stresses are reduced as noted above.

Pneumatic System Benefits

Required air flow capacity is reduced owing to the lack of air driven pumps and the elimination of pneumatic starting.

Fixed Frequency Electrical System Benefits

The large aircraft motor and galley loads are moved to the variable frequency distribution system 86 so that the fixed frequency system can be smaller and less costly. In addition, the DC distribution system 112 is isolated from the fixed frequency distribution system 122, thus preventing distortion on the fixed frequency distribution system 122 owing to the rectification of AC power to DC power. Further, the elimination of large inrush currents for large motors coupled with less distortion causes the quality of the power delivered by the fixed frequency distribution system 122 to be further improved.

Hydraulic System Benefits

The system receives significant benefits from the improved secondary power system. The engine driven hydraulic pump(s) 107 can have reduced capacity to better accommodate cruise needs.

In addition, because the electrically driven pumps 98 and 106 are controlled by the multipurpose converters 96, 104, no inrush current problems arise, which might be encountered through the use of non-solid state controlled pumps. Still further, the inefficient air driven pumps are eliminated in favor of the electrically driven pumps 98, 106.

It should be noted that the relative sizing of the EDP's 98 and 106 can be equal or different depending on peak usage requirements and commonality considerations regarding the stocking of different sized spare pumps.

Main Engine and APU Benefits

Main engine starting is much more efficient electrically than in the prior art system which accomplished starting pneumatically. Also, bleed air demand is reduced because their is no pneumatic starting.

The APU system is also significantly simplified with no need for a hydraulic pump or a DC starter generator system.

DC System Benefits

The battery 116 must still have enough capacity to start the APU 84 through the bidirectional converter(s) 110 or 114 and the multipurpose converter(s) 96 and/or 104. In-flight start reliability is improved with the ability to control speed versus time profile.

Variable Frequency System Benefits

By grouping loads that easily tolerate significantly increased distortion, this system provides reliable APU and main engine starting and DC conversion without significant filtering or active rectification requirements. Each multipurpose converter 96, 104 is capable of starting either a main engine or the APU as well as running any of the hydraulic pumps.

The bidirectional converters 110, 114 provide for APU starting as well as eliminating regulated transformer rectifier units (TRUs) in favor of regulated conversion. This improves the quality of DC power. In addition, if necessary or desirable, battery charging can be accommodated by one or more of the bidirectional converters 110, 114.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights of all modifications which come within the scope of the appended claims are reserved.

I claim:

1. A power system for an aircraft having an engine, comprising:
    a variable frequency generator coupled to the engine;
    a variable frequency electrical distribution system coupled to the variable frequency generator, wherein the variable frequency generator receives power from the variable frequency electrical distribution system during operation in a starting mode to start the engine and which delivers power to the variable frequency electrical distribution system for variable frequency loads during operation in a generating mode;
    a power converter coupled to the variable frequency electrical distribution system and developing variable frequency power;
    a hydraulic distribution system; and
    an electrically driven hydraulic pump coupled between the power converter and the hydraulic distribution system and receiving the variable frequency power from the power converter during operation in the generating mode to provide hydraulic power to the hydraulic distribution system.

2. The power system of claim 1, further including a DC electrical distribution system coupled to the power converter.

3. The power system of claim 2, further including an integrated drive generator (IDG) coupled to the engine and a fixed frequency electrical distribution system coupled to the IDG.

4. The power system of claim 3, wherein the DC electrical distribution system is isolated from the fixed frequency electrical distribution system.

5. The power system of claim 2, further including a battery coupled to the DC electrical distribution system.

6. The power system of claim 1, further including a pneumatic distribution system isolated from the hydraulic distribution system and which receives bleed air from the engine.

7. The power system of claim 1, further including a hydraulic pump driven by the engine and coupled to the hydraulic distribution system.

8. The power system of claim 1, further including an auxiliary power unit (APU) coupled to the variable frequency electrical distribution system by a variable frequency starter generator.

9. The power system of claim 1, wherein the variable frequency distribution system receives 50–60 Hz. power during operation in the starting mode.

10. A power system for an aircraft having a main engine and an auxiliary power unit (APU), comprising:
    a variable frequency generator coupled to the main engine;
    a variable frequency electrical distribution system coupled to the variable frequency generator, wherein the variable frequency generator receives power from the variable frequency electrical distribution system during operation in a starting mode to start the engine and which delivers power to the variable frequency electrical distribution system for variable frequency loads during operation in a generating mode;
    a bidirectional, variable frequency power converter coupled to the variable frequency electrical distribution system;
    a hydraulic distribution system;
    an electrically driven hydraulic pump coupled between the power converter and the hydraulic distribution system and receiving variable frequency power from the power converter during operation in the generating mode to provide hydraulic power to the hydraulic distribution system; and
    a pneumatic distribution system coupled to the APU and the main engine and receiving air therefrom wherein the pneumatic distribution system is isolated from the hydraulic distribution system.

11. The power system of claim 10, further including an integrated drive generator (IDG) coupled to the main engine and a fixed frequency electrical distribution system coupled to the IDG.

12. The power system of claim 10, further including a hydraulic pump coupled between the main engine and the hydraulic distribution system.

13. The power system of claim 10, further including an additional power converter coupled to the variable frequency electrical distribution system and a DC electrical distribution system coupled to the additional power converter.

14. The power system of claim 13, further including a battery coupled to the DC electrical distribution system.

15. The power system of claim 10, further including an additional variable frequency generator coupled between the variable frequency electrical distribution system and the APU.

16. The power system of claim 10, wherein the variable frequency distribution system receives 50–60 Hz. power during operation in the starting mode.

17. A power system for an aircraft having a main engine and an auxiliary power unit (APU), comprising:
    a first variable frequency generator coupled to the main engine;

a second variable frequency generator coupled to the APU;

a variable frequency electrical distribution system coupled to the first and second variable frequency generators, wherein the variable frequency generators receive power from the variable frequency electrical distribution system during operation in a starting mode to start the engine or the APU and which deliver power to the variable frequency electrical distribution system for variable frequency loads during operation in a generating mode;

a first bidirectional power converter coupled to the variable frequency electrical distribution system;

a hydraulic distribution system;

an electrically driven hydraulic pump coupled between the first power converter and the hydraulic distribution system and receiving power from the power converter during operation in the generating mode to provide hydraulic power to the hydraulic distribution system;

an integrated drive generator (IDG) coupled to the main engine;

a fixed frequency electrical distribution system coupled to the IDG;

a second bidirectional power converter coupled to the variable frequency electrical distribution system; and a DC electrical distribution system coupled to the second power converter, wherein the DC electrical power conversion system is isolated from the fixed frequency electrical distribution system.

18. The power system of claim 17, further including a pneumatic distribution system coupled to the APU and the main engine and receiving bleed air therefrom wherein the pneumatic distribution system is isolated from the hydraulic distribution system.

19. The power system of claim 18, further including a hydraulic pump coupled between the main engine and the hydraulic distribution system.

20. The power system of claim 19, wherein the variable frequency distribution system receives 50–60 Hz. power during operation in the starting mode.

* * * * *